United States Patent Office 3,564,651
Patented Feb. 23, 1971

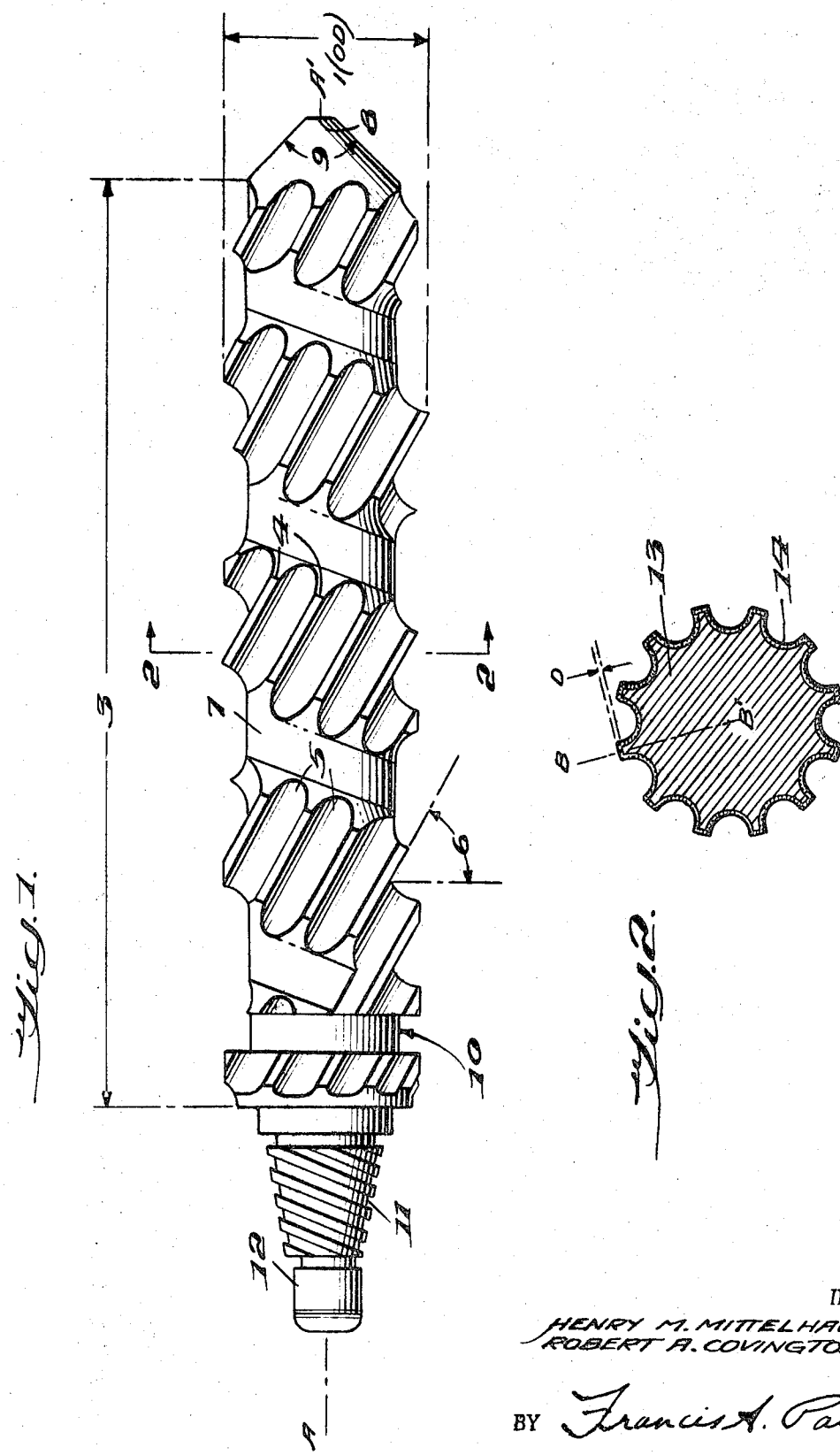

3,564,651
NON-STICK FLUOROCARBON RESIN-SURFACED MIXING ELEMENT
Robert A. Covington, Jr., and Henry M. Mittelhauser, Jr., New Castle County, Del., assignors to E. I. du Pont de Nemours and Company, Wilmington, Del., a corporation of Delaware
Filed Apr. 29, 1968, Ser. No. 725,098
Int. Cl. B29f 3/00
U.S. Cl. 18—12                               6 Claims

ABSTRACT OF THE DISCLOSURE

Mixing elements of elastomer extruders having a non-stick fluorocarbon resin surface and specifically useful in curtailing product inhomogeniety during sulfur halide modification of sulfur-curable elastomers. The fluorocarbon resin comprises tetrafluoroethylene homopolymers or tetrafluoroethylene-hexafluoropropylene copolymers.

BACKGROUND OF THE INVENTION

This invention relates to a process and apparatus for the sulfur halide modification of sulfur-curable elastomers to enhance their working properties and reduce cold flow (excessively high cold compression set). More specifically, the process and apparatus of the present invention permit production of sulfur halide-modified polymers of greater homogeneity than has heretofore been possible.

In the copending application of Anderson, U.S. Ser. No. 618,346, filed Feb. 24, 1967, now abandoned, is disclosed a process wherein the above-mentioned properties of sulfur-curable elastomers are improved by reaction in bulk with a sulfur dihalide such as $SCl_2$ or $SBr_2$ or a sulfur monohalide such as $S_2Cl_2$ or $S_2Br_2$. Sulfur monohalide modifiers, such as $S_2Cl_2$ are preferred because they can produce peptizable polymers and therefore provide significant advantages in the ultimate use of the modified polymers. The term "bulk" includes oil-extended polymer but excludes solutions of polymer. Polymer can be effectively contacted with sulfur halide at any convenient temperature from about room temperature up to the decomposition temperature of the polymer, but preferably an elevated temperature of about 50–225° C. is utilized as providing the modified products most conveniently within a reasonable time. The reaction can be completed in about one minute to several hours, time of reaction being an inverse function of temperature. One way in which Anderson's sulfur halide modification process can be carried out involves addition of halide in a suitable solvent such as normal hexane or any other inert solvent to the polymer while the latter is being propelled through a screw-type extruder such as is conventionally used in extrusion of elastomeric products. The solvent should be less than the amount needed to dissolve the polymer being treated, and is normally less than 10% by weight of the polymer. Usually about 0.1–2% sulfur halide based on polymer weight is adequate and preferably about 0.2–1% is used.

Among extruders suitable for sulfur halide modification are those characterized by an elongated continuous screw which rotates in a closely fitting barrel, wherein the material worked is subjected to shearing, rubbing, and kneading before it is extruded from a terminal die plate. A hopper at the inlet end of the extruder feeds material to be worked to the continuous screw. Beginning at the inlet end, a typical continuous screw for use according to the invention comprises a compression section of diameter increasing stepwise in the direction of material flow through the extruder, usually followed by a metering section of constant root diameter, and finally a mixing element. The mixing element normally has a smaller root diameter than the preceding metering section. Root diameter is the diameter of the screw at the bottom of the screw flights. The mixing screw may be integrally formed on the elongate extruder screw or alternatively, may be adapted for attachment thereto by threaded or other means. In operating the extruder, elastomer is fed through the apparatus until a steady state is achieved and then sulfur halide solution is metered under pressure through an opening in the barrel. Addition of the sulfur halide can occur at any point along the extruder which provides adequate mixing, but preferably takes place at the mixing element.

The process disclosed by Anderson has proved successful in providing acceptable cold compression set while maintaining an adequate balance of processability, curing rate, and retention of vulcanizate properties after cure. However, one problem in connection with the extruder application of that process has arisen; that is, marked inhomogeneity of the product has been manifested by the appearance of dark specks in the extrudate. Attempts to increase mixing in the extruder by increasing shear rate and/or by decreasing sulfur halide concentration within workable limits have not alleviated the problem. The spotted extrudate is undesirable from the standpoint of appearance and commercial acceptance, and may pose additional problems. For example, the specks may constitute sites for the formation of flex cracks in elastomeric products formed from the extrudate.

SUMMARY OF THE INVENTION

According to this invention, there are provided extruder mixing elements having surfaces comprising essentially a non-stick fluorocarbon resin. Use of such mixing elements in extruders employed for sulfur halide modification of alpha-olefin elastomers results in a product wholly free from inhomogeneities; that is, no dark specks appear in the extrudate. That this should be the case is wholly unexpected since the non-stick surface diminishes shear and should therefore *decrease* both mixing effectiveness and product homogeneity. In fact, a different result has been found to obtain. Although mixing effectiveness as to sulfur halide is decreased, yet homogeneity of the blended and reacted product is increased. On the other hand, when it is attempted to diminish inhomogeneity by the normal procedure of simply increasing shear to enhance mixing, no decrease in product inhomogeneity is observed.

DETAILED DESCRIPTION OF THE INVENTION

A more complete understanding of the invention can be had by referring to the drawing attached hereto and in which is depicted one mixing element having a non-stick fluorocarbon resin surface. FIG. 1 is a side elevation of the coated mixing element and, for the purpose of illustration, is shown with one threaded coupling which can be screwed into a suitable top in a helical metering screw. FIG. 2 is a cross-section taken along the line 2—2 of FIG. 1.

In FIG. 1, the mixing element is shown with an outside diameter 1 of O.D. inches and a longitudinal axis A–A'. The length 3 of the mixing element may be from 1 to 10 times the outside diameter, or longer if required. The number of minor flights 4 and minor channels 5 can vary from 2 to about 9 times the outside diameter in inches, and may have a lead of about 0.55 (O.D.) or greater with a helix angle 6 of from 10° to 70° right or left hand. By "lead" is meant the distance along the length of a screw in which a flight makes a complete revolution. For the purpose of illustration, the major channel 7 of FIG. 1 is arranged with a left-hand spiral. Generally, it is desirable to provide the minor flight 4 and channels 5 with the same hand as the continuous screw and the major channel 7 with a hand opposite thereto, as is depicted in FIG. 1. The blunt nose 8 is joined to the ends of the minor flights and channels by a conical surface having an interior apex angle 9 of approximately 90°. An injection groove 10 is preferably provided to facilitate injection of sulfur halide through an appropriately spaced opening in the surrounding extruder barrel (not shown). For purposes of illustration, the particular mixing element depicted is threaded for easy adaption to an existing continuous screw tapped to admit the butt 12 and threaded portion 11 of the mixing element base. The threaded portion 11 of the base and butt 12 are large enough so that the shaft of the continuous screw, after the tapping operation, is strong enough to transmit the torque required for mixing. The mixing element can be incorporated in an existing extruder by lengthening the barrel, if necessary, to accommodate the resulting lengthened continuous screw. Alternatively, a portion of the existing continuous screw can be removed and the mixing element inserted in place thereof. If it is found advantageous to fabricate a continuous screw which incorporates the mixing element, the latter can be designed as an integral part of the continuous screw. Such integral design is particularly advantageous where there is to be provided a continuous screw comprising a repeating series of compression, metering, and mixing sections. It is understood that the mixing element need not be employed in conjunction with, for example, compression and metering sections of a continuous screw. Instead, an autoclave or the like can be used as a reservoir to feed elastomer directly to the mixing element. The radial clearance between the mixing element and the surrounding barrel is not a critical feature of this invention, and standard clearances can be used in designing apparatus for use in a particular process.

FIG. 2 illustrates by cross-section the mixing element 13 having a non-stick fluorocarbon resin surface 14 which in the depicted instance consists of a coating. For the purpose of simplification, the major channel 7 is not shown in this figure. The non-stick fluorocarbon resin extends inwardly along a radial line B–B' through the longitudinal axis, to a depth D. Where the non-stick surface is formed by coating, D is preferably from about 1 to 10 mils, and is most preferably about 3 mils. Alternatively, the mixing elements can be wholly machined from the non-stick fluorocarbon resin, or can comprise a metal core having a non-stick outer section mechanically or otherwise affixed thereto.

The mixing element may be fabricated from any metal conventionally employed in elastomer extrusion processes and is preferably chosen for high corrosion resistance. Accordingly, non-fluorocarbon resin portions of the mixing element are preferably made from stainless steel, Hastelloy C, or Inconel, but most preferably of Hastelloy C. The latter is an alloy approximately containing in parts by weight: 55 Ni; 17 Mo; 16 Cr; 6 Fe; and 4 W. Inconel is a nickel-chromium alloy approximately containing in parts by weight: 78 Ni; 15 Cr; and 7 Fe.

The non-stick fluorocarbon resins employed herein are in block form or in the form of water or organo-based dispersions of the polymeric material, generally containing from about 30 to 60 percent by weight solids. Where the mixing element or a portion thereof is to be machined from fluorocarbon resin, naturally the block form is employed. Dispersions, on the other hand, are used when the requisite non-stick fluorocarbon resin surface consists of a coating on a mixing element substrate.

Where coating techniques are employed herein to provide a non-stick fluorocarbon resin surface, the coating preferably ranges from about 1 to about 10 mils in thickness, and is most preferably about 3 mils thick. Of course, the non-stick surface may also be provided in microscopic thickness, as by rubbing the mixing element with fluorocarbon resin. Such coatings, however, may necessitate frequent applications, requiring disassembling of the extruder device. Coating with aqueous dispersions should normally proceed by a two-coat technique wherein a "primer" coat is first applied and fused, followed by application and fusion of an "enamel" coat. One suitable two-coat technique is disclosed in U.S. Pat. No. 2,562,117 to Osdal, wherein a tenaciously bonded "primer" coat is provided by inclusion therein of chromic acid. Organo-based dispersions, such as are disclosed in assignee's copending U.S. patent application Ser. No. 654,333, now abandoned, of Fang, do not require two-coat application for good adhesion, and for that reason are preferred. However, where coating thickness greater than about 6 mils is desired, it is generally preferable to apply multiple coats of resin, whereby a greater total thickness is obtained without mud-cracking or bubbling.

The resin coating may be applied to the mixing element by conventional techniques. In a preferred embodiment, the mixing element surface or substrate is first cleaned and degreased, and is then roughened, as by blasting with aluminum oxide grit, silica sand, or the like. The substrate is next preheated to the temperature at which the coating is to be subsequently baked and preferably held at that temperature for 5 minutes or more to ensure that the said substrate is free of oils, greases and other impurities which may stain or reduce adhesion of the films. Next, the substrate is sprayed with the fluorocarbon resin dispersion and baked to fuse the coating. Tetrafluoroethylene coatings are baked at a temperature of from about 725° to about 800° and can be baked at 400°–500° F. when used for multiple coat systems. The tetrafluoroethylene-hexafluoropropylene copolymer coating may be baked at from about 570° to about 750° F. Preferred fluorocarbon resins are high molecular weight homopolymers (hereinafter TFE) of tetrafluoroethylene and high molecular weight copolymers (hereinafter FEP) of tetrafluoroethylene and hexafluoropropylene.

Aqueous dispersions of these non-stick resins are sold by E. I. du Pont de Nemours and Company, as "Teflon" TFE fluorocarbon resin and "Teflon" FEP fluorocarbon resin, respectively. "Teflon" is a registered trademark. In the copolymer, the ratio tetrafluoroethylene/hexafluoropropylene is generally from about 90/10 to about 50/50, and preferably is about 85/15. Suitable tetrafluoroethylene-hexafluoroethylene copolymers and methods for their preparation are described in U.S. Pat. No. 2,946,763. Tetrafluoroethylene dispersions and processes of preparing them are described in U.S. Pats. Nos. 2,478,229 and 2,559,752. Organo-based dispersions suitable for providing non-stick fluorocarbon surfaces according to this invention are described in the copending U.S. patent application of Fang, Ser. No. 654,333, now abandoned, filed July 19, 1967, and assigned to the assignee of this invention.

The essential aspect of the invention is that the resin surface comprise essentially a non-stick fluorocarbon resin. "Comprising essentially," as used with reference to resin surface, means that the specified component must be present but other components may also be present providing they do not alter significantly the non-stick property of the surface. Additional components may also be present providing the stick fluorocarbon resin include pigments, fillers, and other film-forming polymers. Use of the latter components, in addition to promoting formation of a thin continuous film on a coated mixing element, permit formation of a thicker film thereon in a single coating. Fluorocarbon resin/film-forming polymer dispersions are discussed at length in U.S. Pat. No. 2,820,752 to Heller.

As noted above, the mixing screw may be used alone or in conjunction with an extruder screw. Where the mixing screw is used in conjunction with an extruder screw it can be integrally formed thereon or can alternatively be adapted for attachment thereto.

Mixing screws other than that depicted in the drawing, are suitable for practice of the present invention. For example, where deterioration of the resin coating is a problem, the minor flights and other sharp edges can be rounded off to reduce attack on the coating.

The resin-surfaced mixing element of the invention can be used in the sulfur halide modification of sulfur curable elastomers generally and is particularly useful with ODM elastomers and mixtures of ODM elastomers with up to 50% of other elastomers. These polymers are well known. The term "ODM" refers to alpha-monoolefin/non-conjugated diene polymers with the backbone of the polymer comprising essentially alkylene groups. Preferred ODM polymers are those in which the alpha-monoolefin is a mixture of ethylene and an alpha-olefin of the formula R—CH=CH$_2$ where R is an alkyl group of up to 8 carbon atoms. These preferred elastomers are preferred to hereinafter as EODM polymers, meaning an ethylene/alpha-olefin/non-conjugated diene polymer with a backbone comprising essentially alkylene groups. "Comprising essentially" in this regard means that the specified structure must be present but other structures can also be present so long as they do not alter significantly the properties of the specified structure. The term "EPDM" is recognized as an EODM polymer comprising essentially ethylene/propylene/non-conjugated diene. Important EPDM polymers at the present time are those in which the diene is dicyclopentadiene; a norbornene, such as an alkenyl (e.g. butenyl) or alkylidene (e.g. methylene or ethylidene) norbornene. Particularly important EPDM polymers are the ethylene/propylene/acyclic non-conjugated diene terpolymers, where the diene is, for example, 1,4-hexadiene (preferred), 6-methyl-1,5-heptadiene, 7-methyl-1,6-octadiene, 11 - ethyl-1,11-tridecadiene, and 1,9-octadecadiene. Representative sulfur curable EPDM elastomers useful in this invention are those disclosed in U.S. Pats. Nos. 3,162,620; 3,093,620 and 2,933,480.

Elastomers modified with sulfur halide in apparatus comprising the resin-surfaced mixing element of this invention find application in a wide range of industrial uses. Among these are included the production of wire and cable, industrial hose and belting, automotive gaskets, seals, hose and tubing; a wide variety of extruded goods for industrial and architectural uses; protective coatings, and a series of consumer products for the shoe, house and garden, and sporting goods fields. Use of the resin-surfaced mixing element is, however, not limited to processes involving sulfur halide modification. In fact, it may be used to advantage in any extrusion process wherein undue adherence of the material worked to the mixing element is a problem.

The following example illustrates the invention. All parts and percentages are by weight unless otherwise specified.

Example (A) Polymer—An EPDM rubber, having a Mooney viscosity (ML-4/250° F.) of 60, is prepared in tetrachloroethylene by copolymerizing ethylene, propylene, and 1,4-hexadiene at 40° C. in the presence of a coordination catalyst made in situ in the reaction by combining diisobutylaluminum monochloride and vanadium tetrachloride. The rubber contains 36±2% propylene monomer units, 3.0±0.4% total 1,4-hexadiene monomer units, and 61.1±3.5% ethylene monomer units. The polymer is oil-extended by mixing 100 parts in a No. 9 Banbury mixer with about 72.4 parts of a naphthenic petroleum oil sold by the Sun Oil Company under the name Circosol 42XH. The oil-extended polymer exhibits a "cold compression set" of 70% (measured by suspending a 0.773-pound brass weight on a rubber pellet 0.75-inch in diameter and 0.5-inch in height for 60 minutes at 60° C.).

Extruder—A 40-inch long, heavy duty screw type extruder (Sterling model 4020, additionally fitted with a mixing screw and die) having a 2-inch (I.D.) barrel is employed. In the compression section, about 25–30-inches long, the value of the root diameter increases step-wise in the direction of material flow to a maximum of 1.87 inches; along the adjacent metering section the root diameter remains at 1.87 inches. Fixed to the outlet end of the extruder is a 9-inch mixing screw, similar in shape to that described in FIG. 1 of U.S. Pat. 3,006,029 to Saxton having a root diameter of about 1.5 inches and coated with a fluorocarbon resin to a thickness of about 1–1.5 mils. At the upstream end of the mixing screw is a hole for pumping in additional materials. The downstream end of the torpedo is attached to a 4-inch die equipped with two ⅜₁₆ inch circular extrusion orifices. The apparatus is heated by 5 band heaters, three on the compressing and metering section and one each on the mixing screw and die. Temperatures of 50° C., 150° C., and 200° C. are set on the first three heaters, respectively; the mixer and die are heated to 200° C.

Fluorocarbon resin—The non-stick fluorocarbon resin coating comprises essentially a copolymer of tetrafluoroethylene and hexafluoropropylene, (85/15) made in accordance with U.S. Pat. No. 2,946,763.

S$_2$Cl$_2$ modification—The extruder screw is operated at 50 r.p.m. Strips of the oil-extended EPDM rubber are fed into the hopper of the extruder. When the extruder is operating smoothly, a saturated mineral oil solution containing 0.1 g. S$_2$Cl$_2$/ml. solution is introduced continuously at the injection groove 10 shown in FIG. 1 in such proportions that about 0.35% by weight sulfur monochloride is added (based on the EPDM rubber itself). The extrudate, produced at the rate of about 38 pounds per hour, is of excellent quality, being completely free from any dark spots indicative of inhomogeneity. The extrudate is easily worked on a rubber roll mill and displays a "cold compression set" of only about 25%.

(B) A comparative run is made using the mixing element of part A but without the non-stick surface of the invention. The product is inhomogeneous, being characterized by dark spotting.

(C) A second comparative run is made wherein in place of the mixing element of part A there is used an uncoated straight, cylindrically smooth (i.e., having no flights) metal mixing element. The uncoated element is of such size and configuration as to exert higher shear than the resin-coated mixing screw of part A. The extruder itself is slightly smaller than the one used in the example having a barrel (I.D.) diameter of 1.25 inches instead of 2.0 inches. The general configuration is similar, there being a compression and metering section in which the portion of the screw increases step-wise in diameter in a direction of material flow through the extruder. Following this 25-inch compression and metering section, there is a 5-inch straight mixing element having a 1.15 inch diameter. About 0.4% by weight sulfur monochloride, based on oil extended EPDM rubber, is reacted by pumping a solution of 0.15 gram per milliter of S$_2$Cl$_2$ in n-hexane. The extruder output is 10-pounds per hour. The extrudate is spotted with dark specks. Thus, the problem of product inhomogeneity is not solved by use of the uncoated mixing element, in spite of the fact that mixing shear is higher than is the case in part A, wherein a fluorocarbon resin-surfaced screw is employed.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. An elastomer extruder mixing element comprising a plurality of helically disposed minor flights and minor channels, said minor flights and minor channels being interrupted by major channels, the improvement wherein said mixing element has a surface comprising essentially a non-stick fluorocarbon resin, thereby substantially increasing the homogeneity of the elastomer mixed.

2. The mixing element of claim 1 wherein the fluorocarbon resin is selected from the group consisting of tetrafluoroethylene homopolymers and tetrafluoroethylene-hexafluoropropylene copolymers.

3. The mixing element of claim 2 wherein the surface is a coating of about 1–10 mils in thickness.

4. The mixing element of claim 1 wherein the element is wholly machined from non-stick fluorocarbon resin.

5. The mixing element of claim 3 wherein the selected fluorocarbon resin is a tetrafluoroethylene-hexafluoropropylene copolymer, and the ratio tetrafluoroethylene/hexafluoropropylene is from about 90/10 to about 50/50.

6. The mixing element of claim 5 wherein the said ratio is about 85/15.

References Cited

UNITED STATES PATENTS 3,106,487   10/1963   Frost _____ 18—(Teflon Digest)

FOREIGN PATENTS 1,284,924   1/1962   France ____ 18—(Teflon Digest)

H. A. KILBY, JR., Primary Examiner